United States Patent [19]

Bolinger

[11] 4,338,903

[45] Jul. 13, 1982

[54] ELECTRONIC CYLINDER IDENTIFICATION APPARATUS FOR SYNCHRONIZING FUEL INJECTION

[75] Inventor: Randy L. Bolinger, Schaumburg, Ill.

[73] Assignee: Motorola Inc., Schaumburg, Ill.

[21] Appl. No.: 183,658

[22] Filed: Sep. 2, 1980

[51] Int. Cl.³ .......................................... G01M 15/00
[52] U.S. Cl. ..................... 123/476; 73/116; 123/414
[58] Field of Search .................. 73/119 A, 116, 117.3; 123/406, 414, 416, 417, 472, 476; 324/397

[56] References Cited

U.S. PATENT DOCUMENTS

| | | | |
|---|---|---|---|
| 3,661,126 | 5/1972 | Baxendale | 123/32 EA |
| 3,702,601 | 11/1972 | Gordon et al. | 123/32 EA |
| 3,757,755 | 9/1973 | Carner | 123/148 E |
| 3,838,397 | 9/1974 | Watson et al. | 340/172.5 |
| 3,906,207 | 9/1975 | Rivere et al. | 235/150.2 |
| 3,971,348 | 7/1976 | Scofield | 123/32 EA |
| 3,982,519 | 9/1976 | Moon | 123/179 L |
| 4,002,152 | 1/1977 | Hoshi | 123/32 EA |
| 4,003,350 | 1/1977 | Eisele et al. | 123/32 EA |
| 4,027,641 | 6/1977 | Moder | 123/179 L |
| 4,040,397 | 8/1977 | Leichle | 123/32 AE |
| 4,082,066 | 4/1978 | Long | 123/32 EA |
| 4,086,884 | 5/1978 | Moon | 123/32 EB |
| 4,094,274 | 6/1978 | Harada et al. | 123/32 EL |
| 4,095,576 | 6/1978 | Hattori et al. | 123/148 E |
| 4,096,841 | 6/1978 | Kindermann | 123/148 E |
| 4,100,895 | 7/1978 | Hattori et al. | 123/117 R |
| 4,104,990 | 8/1978 | Frobenius | 123/32 EA |
| 4,138,976 | 2/1979 | Crall | 123/117 R |
| 4,150,653 | 4/1979 | Grancoin | 123/148 E |
| 4,210,111 | 7/1980 | Hattori et al. | 123/414 |

*Primary Examiner*—Jerry W. Myracle
*Attorney, Agent, or Firm*—James W. Gillman; James S. Pristelski; Phillip H. Melamed

[57] ABSTRACT

An electronic cylinder identification system is disclosed for identifying the occurrence of a predetermined cycle position for a reference cylinder and synchronizing fuel injection for a multi-cylinder engine in accordance thereto. A four cylinder engine rotates a rotary body having two 90 degree spaced peripheral projections and two stationary reluctance sensors are positioned 180 degrees apart about the body and sense the passage of the rotary body projections. Logic circuitry receives signals from the two sensors and determines which sensor is currently providing a logic pulse indicating the passage of a projection and which sensor previously provided such a pulse. The logic circuitry utilizes this information to identify the rotational position of the rotary body by differentiating between occurring identical sensor pulses based upon which sensor previously produced a pulse. Preferably the rotary body is rotated by the engine camshaft which is rotated at one half of the speed of the engine crankshaft which drives the pistons in the engine cylinders through their full engine cycle in two crankshaft revolutions. Fuel injection apparatus is operated in accordance with the identified rotational position of the camshaft.

28 Claims, 3 Drawing Figures

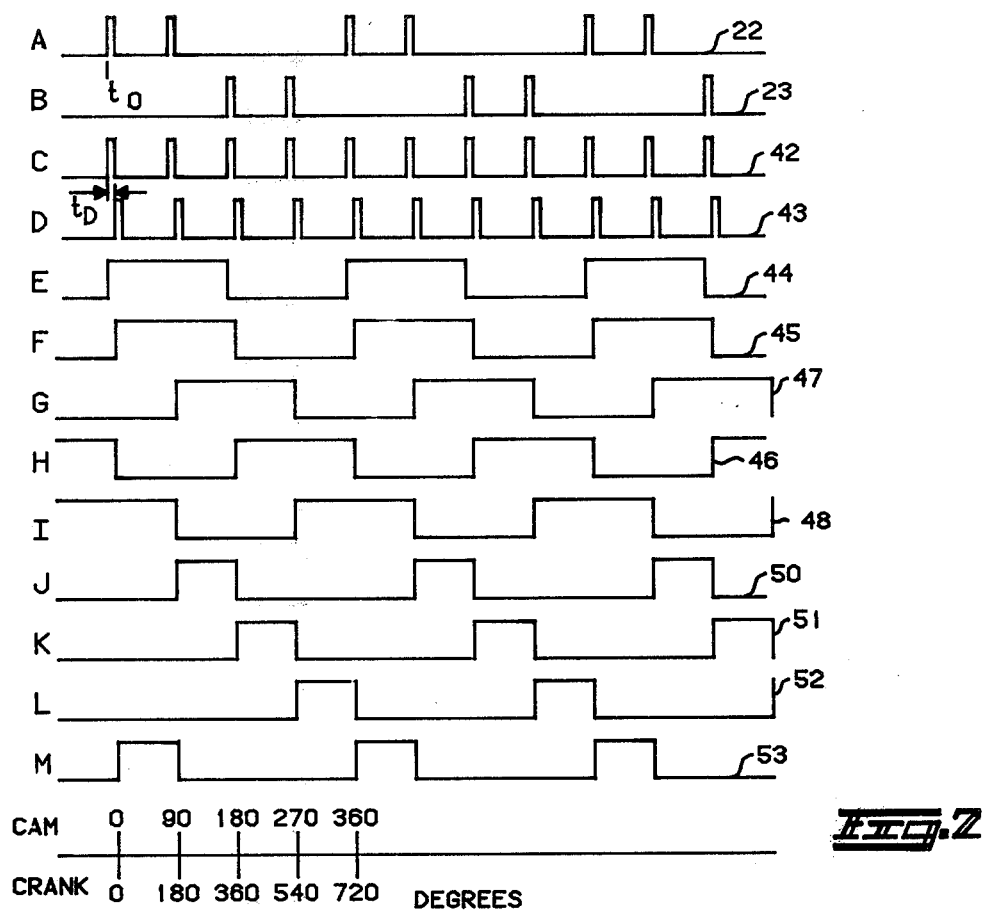

ELECTRONIC CYLINDER IDENTIFICATION APPARATUS FOR SYNCHRONIZING FUEL INJECTION

CROSS-REFERENCE TO RELATED APPLICATIONS

The present invention is related to the invention described in a copending U.S. patent application entitled "Electronic Engine Synchronization and Timing Apparatus" by Roy Hunninghaus and Randy Bolinger, Ser. No. 183,657 filed Sept. 2, 1980, and assigned to the same assignee as the present invention.

BACKGROUND OF THE INVENTION

The present invention generally relates to the field of electronic rotational position indicator apparatus and more particularly to the field of the use of such apparatus in the electronic control of the operation of an internal combustion engine. More specifically, the present invention relates to the use of rotational position indicator apparatus in an electronic cylinder identification system which synchronizes cylinder fuel injection for an internal combustion engine.

For electronic control of the operation of an internal combustion engine, typically it is necessary to identify when the piston of a reference cylinder of a multi-cylinder engine is at a particular position in its reciprocal cycle. In fuel injection systems, typically engine fuel is injected to each cylinder at a predetermined time prior to combustion during the compression stroke of the cylinder. This predetermined time corresponds to a specific position of the cylinder piston in its reciprocal cycle, and this time also directly corresponds to a rotational position of an engine camshaft which is rotated at one half of the rotational speed of the engine crankshaft which supplies the reciprocal driving movement to the cylinder piston. In such fuel injection systems, it is necessary to identify when at least one of the engine cylinders is at a particular point in its compression cycle, then typically the fuel injection of this cylinder and the other cylinders are commenced sequentially in response to the identification of this piston position for the identified reference cylinder.

In prior fuel injection systems, complex mechanical gears have often been utilized to insure the proper synchronization of fuel injection into each of the cylinders. These mechanical systems utilize a complex series of cams that directly control the opening and closing of valves which implement fuel injection. In electronic fuel injection systems, typically electromagnetic relays are utilized to accomplish fuel injection and the control signals for these relays are derived from sensors which sense the rotational position of the engine camshaft and/or crankshaft or perform the equivalent function.

In some electronic fuel injection systems, a single cam lobe is attached to the camshaft such that it will open or close an associated switch at a predetermined rotational position of the camshaft. In this manner, a signal identifying a rotational position of the camshaft is produced and is utilized to synchronize all subsequent fuel injection since the occurrence of this camshaft pulse will directly correspond to known piston position in a reference cylinder. This type of fuel injection system has the deficiency in that it may require a full revolution of the camshaft (which corresponds to two full revolutions of the engine crankshaft) before producing a synchronizing signal to insure the proper synchronization of the fuel injection. Some systems may also substitute a cam projection and an electronic sensor for the cam lobe and switch which generates the reference pulse. The sequencing of fuel injection after the occurrence of the reference pulse is controlled, in some systems, by utilizing a single sensor cooperating with an appropriate number lobe projections on the crankshaft or by utilizing the generated spark timing pulses to provide a signal to index a sequential counter whose count is initialized (set) in accordance with the occurrence of the reference cylinder identification pulse. While many such systems are known, most of these systems suffer from the previously mentioned deficiency of potentially requiring a complete revolution of the engine camshaft before generation of the synchronization pulse. This results in requiring two engine revolutions before initiating the proper sequence of fuel injection. During the intial start-up of the engine this is certainly not desirable. Also additional circuitry may be required to generate the sequence stepping control signals once the reference cylinder has been identified, and this adds to the cost of such systems.

Some prior fuel injection systems disclosed the use of a plurality of stationary electronic sensors for operation in conjunction with a rotary projection making one complete revolution per engine cycle (thus being rotated at the camshaft rotational speed). These systems either suggest utilizing a plurality of projections having different configurations, such as an extending north magnetic pole for one projection and an extending south magnetic pole for the other projection, or they suggest utilizing a large number of camshaft sensors. In either case, while synchronization fuel injection information is obtained more rapidly than the previously discussed systems, this is accomplished by the added expense of requiring additional sensors or by requiring different camshaft projection configurations and thereby requiring sensors which can distinguish between these different projection configurations. In either event, the extra cost of these type of systems has hampered the extensive adoption of such systems.

The rapid identification of a known position for a reference cylinder is not just limited to the field of fuel injection, since some distributorless ignition systems also require the identification of a reference engine cylinder cycle position to insure the proper routing of spark ignition signals to the appropriate engine cylinders. In typical internal combustion engines which include a distributor, this spark signal routing is accomplished by the mechanical rotation of the rotor arm of the distributor. For distributorless ignition systems, reference cylinder identification circuits similar to those described above have been developed and suffer from the same above-mentioned deficiencies of generally requiring either an excessive number of stationary sensors or providing a reference signal only after an excessively large amount of engine crankshaft revolution.

SUMMARY OF THE INVENTION

An object of the present invention is to provide an improved electronic rotational position indicator apparatus which utilizes a minimum number of rotational sensors while rapidly providing a reference signal indicative of a predetermined rotational position.

A more particular object of the present invention is to provide an electronic engine control apparatus which utilizes an electronic rotational position indicator apparatus that minimizes the number of required rotational sensors while rapidly providing a reference signal indicative of a predetermined rotational position.

A further object of the present invention is to provide an electronic reference cylinder identification apparatus which utilizes an improved electronic rotational position indicator apparatus for providing a reference signal adaptable for synchronizing fuel injection for an internal combustion engine while also providing control signals for controlling the sequential routing of signals to engine cylinders.

In one embodiment of the present invention, an electronic rotational position indicator apparatus is provided, comprising: a rotatable body rotated about an axis and having a plurality of peripheral portions spaced apart within a rotational angle of 180 degrees about said axis; a plurality of stationary sensors comprising at least a first sensor and a second sensor spaced 180 degrees of rotation apart about said axis, and positioned adjacent to said rotary body such that each of said sensors produces an electrical signal pulse in response to the passage of each of said peripheral portions of said rotary body past said sensors; and circuitry means coupled to said sensors for receiving said electrical signals from each of said sensors and effectively comparing signals indicative of which of said sensors is providing a present sensor signal pulse with signals indicative of which of said sensors provided the previous sensor signal pulse that immediately preceded the present sensor signal pulse for providing at least one electrical output reference signal indicative of the occurrence of a single predetermined rotational position of said rotary body, whereby a small number of sensors is utilized to determine a predetermined angular position of said rotary body within a minimum amount of angular rotation of said rotary body.

It should be noted that in a broader sense the present invention contemplates utilizing a plurality of stationary sensors positioned at equal angle intervals about said axis while positioning said plurality of peripheral projections within an angle no more than said equal angle interval. This permits rapid position identification with a minimum increse of required sensors.

The present invention contemplates the use of the above-described rotational position indicator apparatus to develop a cylinder identification reference pulse for an electronic engine control system for an internal combustion engine. While the cylinder identification reference pulse developed by the indicator apparatus can be used in distributorless ignition systems for determining which cylinder should receive engine spark signals at a particular time, preferably the present invention contemplates utilizing the reference signal produced by the indicator apparatus for synchronizing the sequence of fuel injection for an internal combustion engine. More particularly, it is contemplated that the reference signal provided by the rotational position indicator apparatus will directly correspond to the rotational position of the engine camshaft which completes one revolution for every complete engine cycle. This reference signal will then be utilized to synchronize an electronic control circuit which injects fuel into cylinders that are associated with different rotational positions of the engine camshaft since those cylinders have their pistons driven by the engine crankshaft which is rotated at a speed of twice that of the engine camshaft. The electronic control circuitry for controlling fuel injection once the cylinder identification reference signal has been produced is known, and the essence of the present invention is the use of the structure recited in the claims for producing the reference signal within a relatively short amount of angular rotation of the engine camshaft while utilizing a relatively small number of rotational position sensors.

It should be noted that the present invention provides for not only producing any cylinder reference pulse corresponding to when one reference cylinder piston is at a predetermined position in its cycle, but also provides pulses related to when each cylinder piston of the internal combustion engine is at a predetermined reference position in its cycle. Thus the present invention provides all of the synchronizing and sequence stepping signals needed to control the sequential injection of fuel into each of the cylinders. Additionally, it should be noted that while a four cylinder embodiment is illustrated, the present invention contemplates expanding the basic apparatus to encompass six and eight cylinder engines in accordance with the principles utilized in the four cylinder apparatus. This is accomplished by either utilizing only two sensors and adding additional camshaft peripheral portions or by adding additional sensors while maintaining only two camshaft peripheral portions. In both cases present and prior pulse information is utilized to determined camshaft rotational position.

BRIEF DESCRIPTION OF THE DRAWINGS

For a more complete understanding of the invention, reference should be made to the drawings, in which:

FIG. 2 is a series of graphs A through O which illustrate various waveforms and timing relationships for signals produced by the apparatus shown in FIG. 1; and FIG. 3 is a table illustrating the operation of the circuit in FIG. 1.

DESCRIPTION OF THE PREFERRED EMBODIMENT

Figure 1:
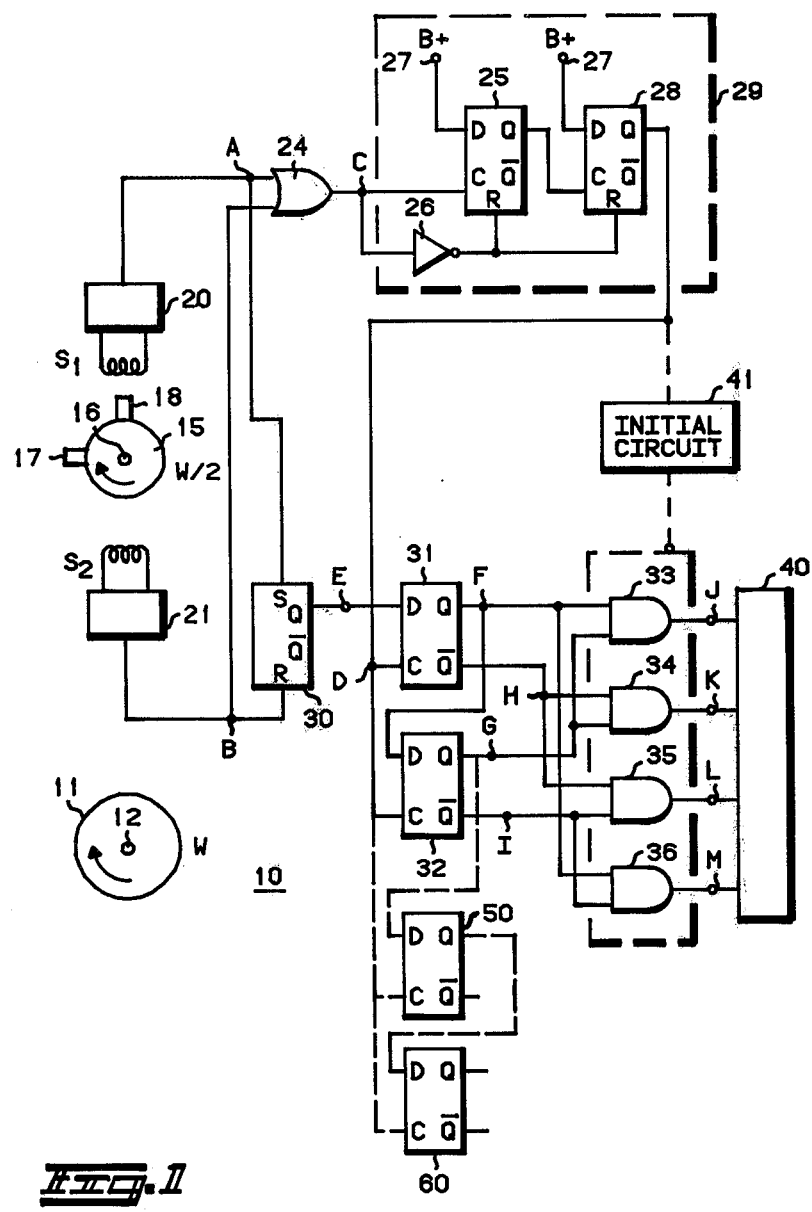
FIG. 1 is a schematic and block diagram illustrating an electronic cylinder identification apparatus for use in synchronizing fuel injection for an internal combustion engine.

FIG. 1 illustrates an electronic cylinder identification apparatus 10 which develops a synchronizing pulse for synchronizing fuel injection for an internal combustion engine (not shown). The internal combustion engine rotates an engine crankshaft 11, represented in FIG. 1 by a rotating body 11 designated by the same reference number, at an angular speed W about a crankshaft axis 12 wherein the rotational speed W represents the speed of the engine and is therefore variable since engine speed is variable. The rotation of the crankshaft 11 results in reciprocating movement of pistons (not shown) in each of the engine cylinders (also not shown), and this operation is conventional wherein each piston will complete one full engine cycle for every two revolutions of the engine crankshaft 11, the engine cycle basically comprising a compression and ignition stroke followed by an expulsion of combusted fuel stroke.

The cylinder identification apparatus 10 shown in FIG. 1 is illustrated for a four cylinder internal combustion engine, but such an apparatus can readily be expanded to provide cylinder identification for six and eight cylinder engines, and this will subsequently be discussed in detail. The four cylinder identification apparatus 10 includes an engine camshaft 15 which is mechanically linked to the engine crankshaft 11 and is rotated at one half of the engine speed W about a camshaft axis 16. The camshaft 15 comprises a rotary body, also designated by the reference number 15, having a pair of identically shaped peripheral radial projections 17 and 18 disposed about the axis 16, projecting outward from the circumference of the rotary body 15, and separated from each other by an angle of 90 degrees, less than 180 degrees, about the axis 16. It is significant to note that the plurality of rotary body projection 17 and 18 are spaced within an angle of 180 degrees about the axis 16, and the significance of this will be noted subsequently. It should also be noted that the number of peripheral projections of the rotary body 15 is equal to one half of the number of engine cylinders (4) and therefore equal to one half of the number of rotational positions of the rotary body 15 which are desired to be identified since the apparatus 10 is intended to produce a cylinder identification reference signal for each of the four cylinders during each full revolution of the camshaft rotary body 15.

A pair of stationary reluctance type sensors $S_1$ and $S_2$ are spaced 180 degrees apart about the axis 16 and are positioned adjacent to the rotary body 15 and its projections 17 and 18. It is contemplated that the projections 17 and 18 will act to influence a magnetic field about the sensors $S_1$ and $S_2$ such that the passage of each of the projections 17 and 18 past the sensors will result in developing electrical sensor signal pulses. The signals produced by the sensors $S_1$ and $S_2$ are coupled to signal processing circuits 20 and 21, respectively, which merely square up the position pulses provided by the sensors and provide the squared up position pulses to input terminals A and B, respectively.

FIGS. 2A and 2B illustrate waveforms corresponding to signals 22 and 23 provided at the terminals A and B, respectively. For the structure shown in FIG. 1, the waveforms for signals 22 and 23 illustrate that at an initial time $t_0$, which corresponds to the time occurrence represented by the position of the components shown in FIG. 1, the projection 18 will pass by the sensor $S_1$ and produce a momentary pulse. This is followed in time by a subsequent identical momentary pulse due to the passage of the projection 17, and subsequently the projections 18 and 17 will pass the sensor resulting in identical pulses for the signal 23 at the terminal B.

Essentially, the present invention functions to identify the rotational position of the rotary body 15 by utilizing sensor signal pulse information related to not only which of the two sensors, $S_1$ or $S_2$, is producing the present sensor pulse, but also which of the sensors produced the previous sensor pulse. In this manner, the rotational indicator apparatus 10 can effectively differentiate between when the projection 18 passes by the sensor $S_1$ from when the identically shaped projection 17 passes by the sensor $S_1$. This differentiation is accomplished without the use of special projection configurations and without the use of a large number of rotational sensors. The end result is that a cylinder identification reference pulse will be provided after the occurrence of only two position pulses produced by any of the the sensors $S_1$ or $S_2$ and this will result in a cylinder identification after only at most one half of a revolution of the camshaft rotary body 15 which corresponds to only one revolution of the engine crankshaft rotary body 11. In addition, the structure of the present invention produces a cylinder identification pulse for each cylinder so that additional circuitry for providing sequence control signals is not required. The present invention represents a vast improvement over prior art systems which could possibly require a full revolution of the engine camshaft before producing a reference pulse or prior art systems which require the construction of different configuration camshaft projections in order to distinguish these projections, or which require a large number of stationary camshaft rotational position sensors, typically four such sensors, to obtain cylinder reference information while providing four cylinder reference pulses to control cylinder sequencing.

The remaining circuitry in FIG. 1 illustrates a typical logic circuit configuration capable of receiving the signals at the terminal A and B and producing a cylinder identification reference signal at at least one of the terminals J through M within one half revolution of the engine camshaft rotary body 15. The circuitry would also then continue to provide sequential cylinder reference pulses for sequentially identifying each of the four cylinders of the four cylinder engine. Preferably, a microprocessor is utilized to simulate the function provided by many of the circuitry components shown in FIG. 1 as comprising the cylinder identification apparatus 10, but FIG. 1 illustrates the basic principles involved and provies a feasible way of using standard logic circuits for obtaining the desired cylinder reference identification pulses. The remaining structure in FIG. 1 will now be described with regard to how it implements the above-noted desired results. These results are summarized in FIG. 3, in tabular form, which illustrates how the occurrence of a present sensor pulse is utilized in combination with information concerning which of the sensors produce the previous sensor pulse to identify the rotational position of the camshaft rotary body 15 which corresponds to a desired reference position of one of the four cylinders, and how this results in producing a cylinder identification reference pulse at one of a plurality of output terminals J through M.

The terminals A and B are coupled as inputs to an OR gate 24 which provides an output at a terminal C that is directly coupled to the clock terminal (C) of a D type flip-flop 25 and is coupled through an inverter 26 to the reset terminal (R) of the flip-flop 25. The data terminal (D) of the flip-flop 25 is connected to a B+ terminal 27 and a non-inverted output terminal Q of the flip-flop is coupled to the clock terminal of a subsequent D-type flip-flop 28 which has its reset terminal directly coupled to the reset terminal of the flip-flop 25, its data terminal connected to the B+ terminal 27, and its non-inverted output terminal Q connected to an output terminal D. Essentially the components 25 through 28 form a delay circuit 29 (shown dashed) which is utilized to delay, by a small but finite amount, each of the pulses produced at the terminal C and provide these delayed pulses at the terminal D. The significance of this will be noted subsequently.

The terminal A is coupled to the set input terminal (S) of a set reset flip-flop 30 which has its reset terminal (R) directly connected to the terminal B and its non-inverted output terminal Q connected to a terminal E. The terminal E is coupled to the data input terminal of a D-type flip-flop 31 which has its clock terminal connected to the terminal D, its Q output terminal connected to a terminal F and its $\overline{Q}$ inverted output terminal connected to the terminal H. The terminal D is also coupled to the clock input terminal of a D-type flip-flop 32 having its data terminal connected to the terminal F, its $\overline{Q}$ output terminal connected to a terminal G and its Q output terminal connected to a terminal I.

The terminal F is directly connected as an input to AND gates 33 and 36, the terminal H is connected as an input to AND gates 34 and 35, the terminal G is connected as an input to AND gates 33 and 34, and the terminal I is connected as an input to AND gates 35 and 36. The output of each of the AND gates 33 through 36 is coupled to an associated one of a plurality of output terminals J, K, L, and M, respectively. At the terminals J through M, cylinder identification reference signal output pulses are provided in accordance with the rotational positions of the rotary body 15 and these output signal pulses are coupled to and utilized by a fuel injection and/or distributorless ignition system electronic control circuit 40 of conventional design to accomplish fuel injection and/or to deliver spark ignition pulses for desired engine cylinders in synchronization with the occurrences of specific camshaft rotational positions.

An initializing circuit 41 is illustrated in FIG. 1 and essentially is contemplated as receiving an input from the terminal D and providing a control output to the AND gates 33 through 36 to prevent these AND gates from producing any output signals until at least two sensor position pulses have been provided by the combination of the sensors $S_1$ and $S_2$. This insures that the signals at the terminals J through M will truly be representative of the desired rotational position of the rotary body 15 since the cylinder identification circuit 10 requires not only the occurrence of a present sensor pulse, but also information concerning which of the sensors produced the previous sensor pulse in order to properly identify a specific rotational position of the camshaft rotary body 15 that corresponds to a desired piston cycle position for any one of the four cylinders.

The operation of the circuitry illustrated in FIG. 10 will now be described with respect to the signal waveforms shown in FIG. 2 and with respect to the table illustrated in FIG. 3. It should be noted that for all of the waveforms illustrated in FIG. 2, the horizontal axes represent time and all waveforms are drawn to the same time scale.

Essentially, the camshaft position pulses of signals 22 and 23 at the terminals A and B are combined by the OR gate 24 to produce at the terminal C a composite signal 42 which is illustrated in FIG. 2C. The delay circuit 29 processes the signal 42 and provides a slightly delayed signal 43 at the terminal D directly related to the signal 42 but having its initial time occurrences delayed by a time $t_D$. The signal 43 is illustrated in FIG. 2D.

The set-reset flip-flop 30 is set to provide a high logic state at the terminal E for each occurrence of the $S_1$ camshaft position pulses, and the logic state of the terminal E is set to a low condition in response to each occurrence of camshaft position pulses provided by the sensor $S_2$. The signal at the terminal E has the waveform shown in FIG. 2E and is designated by the reference number 44.

The flip-flop 31 utilizes the delayed signal 43 to produce a signal 45 at the terminal F which essentially corresponds to the signal 44 delayed by the time $t_D$, while the flip-flop 31 also produces an opposite polarity signal 46 having identical time occurrences at the terminal H. The waveforms of the signals 45 and 46 are illustrated in FIGS. 2F and 2H, respectively. The flip-flop 31 creates the signals 45 and 46 by effectively sampling and holding the signals at its data terminal in response to each positive pulse transition produced at its clock terminal, and the operation of the flip-flop 32 is identical. All D type flip-flops shown in FIG. 1 are actuable only on positive clock signal transitions. The flip-flop 32 responds to its inputs from the terminals D and F to provide signals 47 and 48 at the terminals G and I, respectively, in response thereto. The waveforms of the signals 47 and 48 are illustrated in FIGS. 2G and 2I.

In designing the delay circuit 29 it should be realized that the reason for delaying the positive transitions at the terminal D by times $t_D$ is to provide sufficient time for the flip-flop 30 to attain stable logic states in response to the sensor pulse signals 22 and 23. Thus the time delay $t_D$ should be made sufficient to accomplish this goal.

Essentially the signal 47 represents the signal 45 at the terminal F but delayed by a period of time equal to the time between the occurrence of one of the camshaft position pulses provided at the sensors $S_1$ and $S_2$ and the next position pulse provided at the sensors. Thus, it is apparent that by comparing the signals 45 and 46 with the signals 47 and 48, the AND gates 33 through 36 effectively compare signals (45 and 46) which are indicative of which sensor is currently producing a camshaft rotary body position pulse with signals (47 and 48) which are indicative of which of these sensors provided with previous sensor signal pulse that immediately preceded the present sensor signal pulse. This can be shown by noting that the logic states of the signals 45 and 46 are directly related to which of the sensors $S_1$ or $S_2$ is currently providing a camshaft position pulse whereas the logic states of the signals 47 and 48 are related to which of the sensors $S_1$ or $S_2$ produced the previous camshaft position pulse.

It should be noted that the signal 45, for example, has a high logic state provided directly in response to each camshaft position pulse currently produced by the sensor $S_1$ and the signal 45 is switched to a low logic state in response to each position pulse currently produced by the sensor $S_2$. This is contrasted with the signal 47, for example, which has logic states that effectively correspond to which of the sensors produced the previous camshaft position pulse wherein, a high logic state would indicate a previous pulse by sensor $S_1$ and a low logic state would indicate a previous pulse by sensor $S_2$.

At the output terminals J through M output cylinder identification pulse signals 50 through 53 are provided and the signal waveforms are illustrated in FIGS. 2J–2M, respectively. The occurrence of a high logic state on each of the output signals 50–53 indicates the occurrence of a predetermined rotational position of the camshaft rotary body 15 that corresponds to the identification of a predetermined cycle position for one of the four cylinders.

The signals 50 through 53 are utilizable by the circuit 40 to control the opening of electronic fuel injection valves into identified cylinders at the appropriate time since the positioning of the projections 17 and 18 on the camshaft rotary body 15 is such that, for example, when projection 17 is opposite the sensor $S_1$ this position of the rotary body 15 would correspond to the proper time for injecting fuel into cylinder number 1 and this is indicated by a high logic state on the output signal 50. Also, in a distributorless ignition system circuit 40 can control the routing of a spark signal to the proper engine cylinder by the use of elementary logic elements. In either case, circuit 40 would be of conventional design since all electronic fuel injection and distributorless ignition systems use such circuits. For fuel injection systems the signals 50–53 could directly drive electronic associated fuel injection valve relays (electronic switches) or initiate the production of relay drive signals for associated valve relays.

FIG. 20 illustrates the correspondence of the camshaft and crankshaft angular rotational positions with respect to all of the waveforms shown in FIG. 2 and it should be noted that all the FIG. 2 waveforms are drawn to the same horizontal time scale so that corresponding time occurrence relationships will be apparent.

In essence, the present invention has provided circuitry for analyzing which of the sensors $S_1$ or $S_2$ is currently producing a position pulse and which of these sensors previously produced the last position pulse. In response to this information, as shown in the table in FIG. 3, specific engine cylinders are identified and pulses are provided at the output terminals J through M which indicate that fuel injection (or spark) for the identified cylinder is desired because of the rotational position of the camshaft rotary body 15.

It should be noted that the present invention actually can identify any two of the four cylinders by the existence of any one position pulse provided by the sensors $S_1$ or $S_2$, and this is indicated by the lower portion of the table in FIG. 3. Of course after the second position pulse, then enough information has been obtained to precisely identify which one of the four cylinders should have its fuel injection or spark synchronized to the rotational position of the cam rotary body 15. The significance of this is that it may be desirable to, under certain circumstances, fuel inject pairs of cylinders during the initial start up of the engine until enough information has been gathered to identify exactly which cylinder should receive fuel injection. This would amount to a minor extra injection of fuel into one cylinder during its exhaust stroke and should not seriously impair the operation of the engine.

The function of the initializing circuit 41 is to insure that the AND gates 33 through 36 do not provide any synchronizing information until at least two position pulses have been produced by the sensors $S_1$ and $S_2$. This can readily be accomplished by having the circuit 41 comprise a two count counter which sets a latch high upon the second count. The input to the circuit 41 is a series of pulses (signals 42 or 43) representative of each produced camshaft position sensor pulse. The output of the circuit 41 would then be connected as another input to each of the AND gates 33 through 36. Of course if injection is desired upon the occurrence of the first of the sensor pulses into a pair of cylinders, then the initializing circuit 41 could merely comprise a latch which is set high upon the first occurrence of a position pulse.

The four cylinder system 10 shown in FIG. 1 can be readily expanded to provide cylinder reference information for six cylinder and eight cylinder engines in the following manner without the addition of any more sensors. For a six cylinder engine, the projections 17 and 18 of the rotary body 15 should be replaced by three peripheral radial projections spaced apart from each other at slightly less than 60 degree intervals. The circuitry in FIG. 1 would then be modified such that there would be six, instead of four, AND gates and an additional flip-flop 50 (shown dashed) corresponding to the flip-flop 32 would be added. The additional AND gates and sensor projections for the six cylinder system are not shown to maintain the clarity of FIG. 1. In such a six cylinder system three sensor pulse detections are required before generating a cylinder reference identification pulse to synchronize the fuel injection or spark of the six cylinder engine since for a six cylinder engine information concerning which sensor produced the present camshaft position pulse would necessarily be combined with information as to which sensors produced the last two previous sensor pulses in order to positively identify the rotational position of the cam rotary body 15. In a similar manner, for an eight cylinder engine, the rotary body 15 would have four peripheral radial projections spaced at slightly less than 45 degrees and by using an additional flip-flop 60 (shown dashed) and a total of eight AND gates, information concerning which sensor produced the present reference pulse would be combined with information concerning which of the sensors produced the last three sensor pulses in order to identify which of the eight cylinders should have fuel injected to it or spark delivered to it at the corresponding rotational position of the cam 15.

In the six and eight cylinder further embodiments, it should be noted that the number of peripheral projections provided on the rotary body 15 are always disposed within a total of 180 degrees of angle about the axis 16 degrees of angle about the axis 16 while the sensors $S_1$ and $S_2$ remain stationary and spaced at 180 degrees about the axis 16. This results in requiring no more than one half of a revolution of the cam rotary body 15 in order to produce sufficient information to positively identify the precise rotational position of the cam rotary body 15 despite the fact that the peripheral projections are identical in nature and that therefore the apparatus 10 must distinguish between the passage of identical projections by a stationary position sensor. The present invention also provides cylinder sequence control signals at the terminals J-M, and all this is accomplished by using only two position sensors. Thus, the present invention provides an improvement over the prior systems which would require possibly a full revolution of the cam rotary body 15 before the rotational position of the cam rotary body could be positively identified by a stationary sensor, or which would require the rotary body 15 to have different peripheral projection configurations to distinguish these projections from each other, or which would require an excessive number of sensors to provide fuel injection or spark cylinder identification and sequence control pulses.

It should be noted that if additional sensor cost is not prohibitive, and if a more rapid determination of camshaft angular position is desired, the four cylinder apparatus 10 in FIG. 1 can be expanded in a different manner for six and eight cylinder engines while still using less than (only half of) six or eight sensors, respectively. For a six cylinder system this involves using three stationary sensors spaced at equal angle intervals of 120 degrees about the axis 16 while spacing the projections 17 and 18 at less than the equal angle interval of 120 degrees. The signals from each of the three sensors would then be received by circuitry which by noting which of the three sensors presently produced a sensor pulse and which of the three sensors produced the last previous sensor pulse could identify the camshaft rotational position. Similarly, for an eight cylinder engine system four stationary sensors would be positioned at equal angle intervals of 90 degrees about the axis 16 and the two projections 17 and 18 would be spaced apart at less than this 90 degree angle interval. Then receiving circuitry would provide camshaft rotational position indicating signals by noting which of the four sensors provided the present sensor pulse and which provided the last previous sensor pulse. These type of systems for six and eight cylinder engines may, in some instances, be preferable to using only two sensors and providing rotational position indications within one half of a camshaft revolution since these systems provide position indications within one third and one quarter of a camshaft revolution, respectively, at the cost of utilizing additional (more than two) sensors positioned at equal angle intervals. The projections 17 and 18 must be positioned at less than the equal angle interval so that two sensors don't produce position pulses simultaneously.

In expanding the four cylinder apparatus 10 to accommodate six and eight cylinder engines as recited above, it should be noted that either two sensors are used and circuitry compares information as to which sensor provided the present pulse with information as to which of the two sensors provided two or more previous pulses, or more than two sensors are utilized and circuitry compares information as to which sensor provided the present pulse with information as to which sensor provided the last previous pulse. In both of these types of apparatus, the crux is the comparison of the present pulse information with the previous pulse information.

While I have shown and described specific embodiments of this invention, further modifications and improvements will occur to those skilled in the art. All such modifications which retain the basic underlying principles disclosed and claimed herein are within the scope of this invention.

I claim:

1. An electronic identification apparatus for identifying a predetermined rotational position of a rotating body, comprising:
    a rotary body rotated about an axis and having a plurality of spaced apart peripheral portions angularly positioned within a rotational angle of less than 180 degrees about said axis;
    a plurality of stationary sensors comprising at least a first sensor and a second sensor spaced 180 degrees of rotation apart about said axis, and positioned adjacent to said rotary body such that each of said sensors produces an electrical signal pulse in response to the passage of each of said peripheral portions of said rotary body past said sensors; and
    circuitry means coupled to said sensors for receiving said electrical signals from each of said sensors and effectively comparing signals indicative of which of said sensors is providing a present sensor signal pulse with signals indicative of which of said sensors provided the previous sensor signal pulse that immediately preceded the present sensor signal pulse for providing at least one electrical output reference signal indicative of the occurrence of a single predetermined rotational position of said rotary body, whereby a small number of sensors is utilized to determine a predetermined angular position of said rotary body within a minimum amount of angular rotation of said rotary body.

2. An electronic identification apparatus according to claim 1 wherein said number of peripheral portions is equal to one half of the number of rotational positions of said rotary body which are desired to be identified and wherein said plurality of sensors consist of two sensors spaced 180 degrees apart about said axis.

3. An electronic identification apparatus according to claim 2 wherein said circuitry means includes means for inhibiting the production of said electrical output reference signal until after the occurrence of at least two of said sensor electrical signal pulses.

4. An electronic identification apparatus according to claims 1, 2 or 3 wherein said peripheral portions comprise identically shaped radial outward projections disposed about the circumference of said rotary body.

5. An electronic identification apparatus according to claim 4 wherein said plurality of peripheral portions comprise two projections spaced apart by 90 degrees of angle about said axis and wherein said circuitry means provides four of said electrical output reference signals indicative of four different angular positions of said rotary body.

6. An electronic identification apparatus according to claim 4 wherein the number of said peripheral portions is three spaced apart at increments of 60 degrees of angle about said axis and wherein said circuitry means provides six of said electrical output reference signals indicative of six different angular positions of said rotary body.

7. An electronic identification apparatus according to claim 4 wherein said number of peripheral portions is four and said portions are disposed about said axis at 45 degree increments, and wherein said circuitry means develops eight of said electrical output reference signals indicative of eight different angular positions of said rotary body.

8. An electronic identification apparatus according to claim 4 wherein said plurality of peripheral portions comprise n projections spaced apart by 180/n degrees of angle about said axis and wherein said circuitry provides 2n of said electrical output reference signals indicative of 2n different angular positions of said rotary body, n being an integer more than one.

9. An electronic cylinder identification apparatus adaptable for synchronizing fuel injection for an internal combustion engine, comprising:
    a rotary body rotated by an engine shaft about an axis and having a plurality of spaced apart peripheral portions angularly positioned within less than 180 degrees of angular rotation about said axis, wherein the number of said portions is equal to at least one half of a number of different rotational positions of said shaft which are desired to be identified and said portions are located about said rotary body at said one half of said desired rotational positions;
    a plurality of stationary sensors comprising at least a first and a second sensor spaced 180 degrees of rotation apart about said axis and positioned adjacent to said rotary body, each of said sensors producing an electrical signal pulse in response to the rotational passage of each of said peripheral portions of said rotary body past said sensors;
    circuitry means coupled to said sensors for receiving said electrical signals from each of said sensors and effectively comparing signals indicative of which of said sensors is providing a present sensor signal pulse with signals indicative of which of said sensors provided the previous sensor signal pulse immediately preceding the present sensor signal pulse for providing at least one electrical output reference signal indicative of the occurrence of one of said desired predetermined rotational positions of said rotary body, whereby a small number of sensors are utilized to determine a predetermined desired angular position of said rotary body associated with a predetermined engine cycle position for a reference cylinder within a minimum amount of angular rotation of said rotary body; and engine control circuit apparatus for receiving and utilizing said rotational position indicative signal to synchronize an electronic control circuit for combustion cylinders of said engine.

10. An electronic cylinder identification apparatus according to claim 9 wherein said number of peripheral portions is equal to one half of the number of engine cylinders and wherein said plurality of sensors consist of two sensors spaced 180 degrees apart about said axis.

11. An electronic cylinder identification apparatus according to claim 10 wherein said circuitry means includes means for inhibiting the production of said electrical output reference signal until after the occurrence of at least two of said sensor electrical signal pulses.

12. An electronic cylinder identification apparatus according to claims 9, 10 or 11 wherein said peripheral portions comprise identically shaped radial outward projections disposed about the circumference of said rotary body.

13. An electronic cylinder identification apparatus according to claim 12 wherein said plurality of peripheral portions comprise two projections spaced apart by 90 degrees of angle about said axis and wherein said circuitry means provides four of said electrical output reference signals indicative of four different angular positions of said rotary body for synchronizing an electronic control circuit for a four cylinder engine.

14. An electronic cylinder identification apparatus according to claim 12 wherein the number of said peripheral portions is three spaced apart at increments of 60 degrees of angle about said axis and wherein said circuitry means provides six of said electrical output reference signals indicative of six different angular positions of said rotary body for synchronizing an electronic control circuit for a six cylinder engine.

15. An electronic cylinder identification apparatus according to claim 12 wherein said number of peripheral portions is four and said portions are disposed about said axis at 45 degree increments, and wherein said circuitry means develops eight of said electrical output reference signals indicative of eight different angular positions of said rotary body for synchronizing an engine control circuit for an eight cylinder engine.

16. An electronic cylinder identification apparatus according to claim 12 wherein said engine control circuit apparatus includes means for controlling fuel injection into engine cylinders.

17. An engine cylinder identification apparatus according to claim 12 wherein said plurality of peripheral portions comprise n projections spaced apart by 180/n degrees of angle about said axis and wherein said circuitry provides 2n of said electrical output reference signals indicative of 2n different angular positions of said rotary body for synchronizing an electronic control circuit for a 2n cylinder engine, n being an integer more than one.

18. An electronic cylinder identification apparatus according to claim 10 wherein said engine shaft corresponds to the engine camshaft utilized for driving the rotor of a spark distributor for an ignition system for the engine.

19. An electronic cylinder identification apparatus according to claim 10 wherein said engine shaft corresponds to an engine camshaft rotated at one half of the angular rotation of an engine crankshaft which provides driving movement for cylinder pistons.

20. An electronic cylinder identification apparatus according to claim 19 wherein said engine is a four cylinder engine.

21. An electronic identification apparatus for identifying a predetermined rotational position of a rotating body, comprising:

a rotatable body rotated about an axis and having a plurality of peripheral portions spaced apart about said axis;

a plurality of stationary sensors, comprising at least a first sensor and a second sensor spaced apart at equal angle intervals about said axis, and positioned adjacent to said rotary body such that each of said sensors produces an electrical signal pulse in response to the passage of each of said peripheral portions of said rotary body past said sensors;

said plurality of peripheral portions angularly positioned on said rotary body within an angle less than said equal angle interval; and circuitry means coupled to said sensors for receiving said electrical signals from each of said sensors and effectively comparing signals indicative of which of said sensors is providing a present sensor signal pulse with signals indicative of which of said sensors provided the previous sensor signal pulse that immediately preceded the present sensor signal pulse for providing at least one electrical output reference signal indicative of the occurrence of a single predetermined rotational position of said rotary body, whereby a relatively small number of sensors is utilized to determine a predetermined angular position of said rotary body within a minimum amount of angular rotation of said rotary body.

22. An electronic identification apparatus according to claim 21 wherein said number of peripheral portions is equal to two.

23. An electronic identification apparatus according to claim 22 wherein said circuitry means includes means for inhibiting the production of said electrical output reference signal until after the occurrence of at least two of said sensor electrical signal pulses.

24. An electronic identification apparatus according to claims 21, 22 or 23 wherein said peripheral portions comprise identically shaped radial outward projections disposed about the circumference of said rotary body.

25. An electronic identification apparatus according to claim 24 wherein said plurality of peripheral portions comprise two projections spaced apart by less than 180 degrees of angle about said axis and wherein said plurality of sensors consist of two sensors spaced at an equal angle interval of 180 degrees about said axis.

26. An electronic identification apparatus according to claim 24 wherein said plurality of peripheral portions comprise two projections spaced apart by less than 120 degrees of angle about said axis and wherein said plurality of sensors consist of three sensors spaced at equal angle intervals of 120 degrees about said axis.

27. An electronic identification apparatus according to claim 24 wherein said plurality of peripheral portions comprise two projections spaced less than 90 degrees of angle about said axis and wherein said plurality of sensors consist of four sensors spaced at equal angle intervals of 90 degrees about said axis.

28. An electronic identification apparatus according to claim 24 wherein said plurality of peripheral portions comprise two projections spaced apart by less than 360/n degrees of angle about said axis and wherein said plurality of sensors consist of n sensors spaced at an equal angle interval of 360/n degrees about said axis, n being an integer more than one.

* * * * *